United States Patent
Furuya et al.

[11] Patent Number: 6,056,531
[45] Date of Patent: *May 2, 2000

[54] APPARATUS FOR VACUUM FORMING SYNTHETIC RESIN PRODUCTS

[75] Inventors: Tamio Furuya, Hidaka; Kenichi Chujo, Saitama-ken; Akihiro Kameshima; Satoru Iriyama, both of Tokorozawa; Keiichi Kikawa, Sayama, all of Japan

[73] Assignee: Honda Giken Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/887,135

[22] Filed: Jul. 2, 1997

[30] Foreign Application Priority Data

Jul. 2, 1996 [JP] Japan .................................. 8-172360

[51] Int. Cl.$^7$ ...................................... B29C 51/32
[52] U.S. Cl. ...................... 425/302.1; 425/388; 264/554; 264/154; 264/155; 264/163
[58] Field of Search ....................... 264/554, 154, 264/155, 163; 475/388, 290, 302.1

[56] References Cited

U.S. PATENT DOCUMENTS

| | | | |
|---|---|---|---|
| 3,802,308 | 4/1974 | Davis, Jr. ............................... | 83/99 |
| 4,104,349 | 8/1978 | Hillgenberg ............................. | 264/153 |
| 4,243,456 | 1/1981 | Cesano .................................... | 264/163 |
| 5,188,787 | 2/1993 | King et al. ............................. | 264/153 |
| 5,393,474 | 2/1995 | Souders .................................. | 264/163 |

FOREIGN PATENT DOCUMENTS

56-149617  11/1981  Japan .

Primary Examiner—Jan H. Silbaugh
Assistant Examiner—Edmund H. Lee
Attorney, Agent, or Firm—Birch, Stewart, Kolasch & Birch, LLP

[57] ABSTRACT

A vacuum forming apparatus has a first mold and a second mold, the first mold including a forming surface. The first mold has a hollow space defined therein and communicating with the forming surface through holes defined in the first mold. The hollow space is connected to a vacuum pump for developing a vacuum in the hollow space to attract a sheet against the forming surface through the holes. The second mold has a presser including a cylinder which displaces a cutter having a serrated trimming blade of the second mold. The presser has an upper groove which accommodates teeth of the serrated trimming blade. The first mold has a lower groove for receiving the teeth of the serrated trimming blade when it is displaced downwardly by the cylinder.

8 Claims, 10 Drawing Sheets

APPARATUS FOR VACUUM FORMING SYNTHETIC RESIN PRODUCTS

BACKGROUND OF THE INVENTION

1. Field of the Invention

The present invention relates to an apparatus for and a method of forming a synthetic resin product such as an automotive instrument panel or the like according to a vacuum forming process.

2. Description of the Related Art

It has been a conventional practice to shape a synthetic resin sheet with a vacuum forming mold and then trim off unnecessary portions from the shaped sheet. Japanese laid-open utility model publication No. 56-149617 discloses a vacuum forming apparatus of the draping type which has a hot trimming cutter. The disclosed vacuum forming apparatus simultaneously forms and trims a thermoplastic sheet. The hot trimming cutter has a built-in heater for melting and cutting off the thermoplastic sheet.

If a thermoplastic sheet to be shaped by the conventional vacuum forming apparatus comprises a laminated sheet having a foamed layer, however, since the foamed layer is resilient, the foamed layer may be dragged in a trimming direction by the trimming cutter as it moves to trim the thermoplastic sheet, possibly preventing the thermoplastic sheet from being cut off. Since the heater of the hot trimming cutter heats the thermoplastic sheet with heat, the thermoplastic sheet may not be clearly cut to a desired shape, but may be burred at the severed edge. If a shaped thermoplastic sheet is used as an automotive instrument panel, for example, it has many openings for installing various components such as an aid-conditioner component, etc. Burred edges of the openings prevent such various components from being properly installed in the openings.

The foamed layer of the thermoplastic sheet has substantially spherical cells containing air therein. Depending on the direction or angle in which the trimming cutter cuts off the thermoplastic sheet, some of those cells in the foamed layer are broken, reducing the quality of the thermoplastic sheet. Alternatively, while the thermoplastic sheet is being severed by the trimming cutter, cells may be displayed or deformed by the trimming cutter, preventing the trimming cutter from imparting appropriate shearing forces to the thermoplastic sheet.

SUMMARY OF THE INVENTION

It is a general object of the present invention to provide an apparatus for and a method of forming a resilient sheet according to a vacuum forming process easily and reliably to a desired shape at a normal temperature, i.e., without the use of a heating device, while producing neat severed edges in the resilient sheet for easily installation of components thereon.

A major object of the present invention to provide an apparatus for and a method of forming a resilient sheet having a foamed layer according to a vacuum forming process while easily cutting off the resilient sheet with a serrated trimming blade such that teeth of the serrated trimming blade will move substantially spherical closed cells containing air in the foamed layer into recesses between the teeth.

Another object of the present invention to provide an apparatus for and a method of forming a sheet according to a vacuum forming process while easily cutting off the sheet with a cutting edge without the danger of damage to the cutting edge due to contact with a mold.

Still another object of the present invention to provide an apparatus for and a method of forming a resilient sheet according to a vacuum forming process while cutting off the resilient sheet with a serrated trimming blade that smoothly cuts into the resilient sheet to form neat cut edges.

A further object of the present invention to provide an apparatus for and a method of forming a sheet according to a vacuum forming process while effectively cutting off the sheet with a serrated trimming blade such that teeth of the serrated trimming blade will move substantially spherical closed cells containing air in the sheet into other positions in the sheet and fix them in recesses between the teeth.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
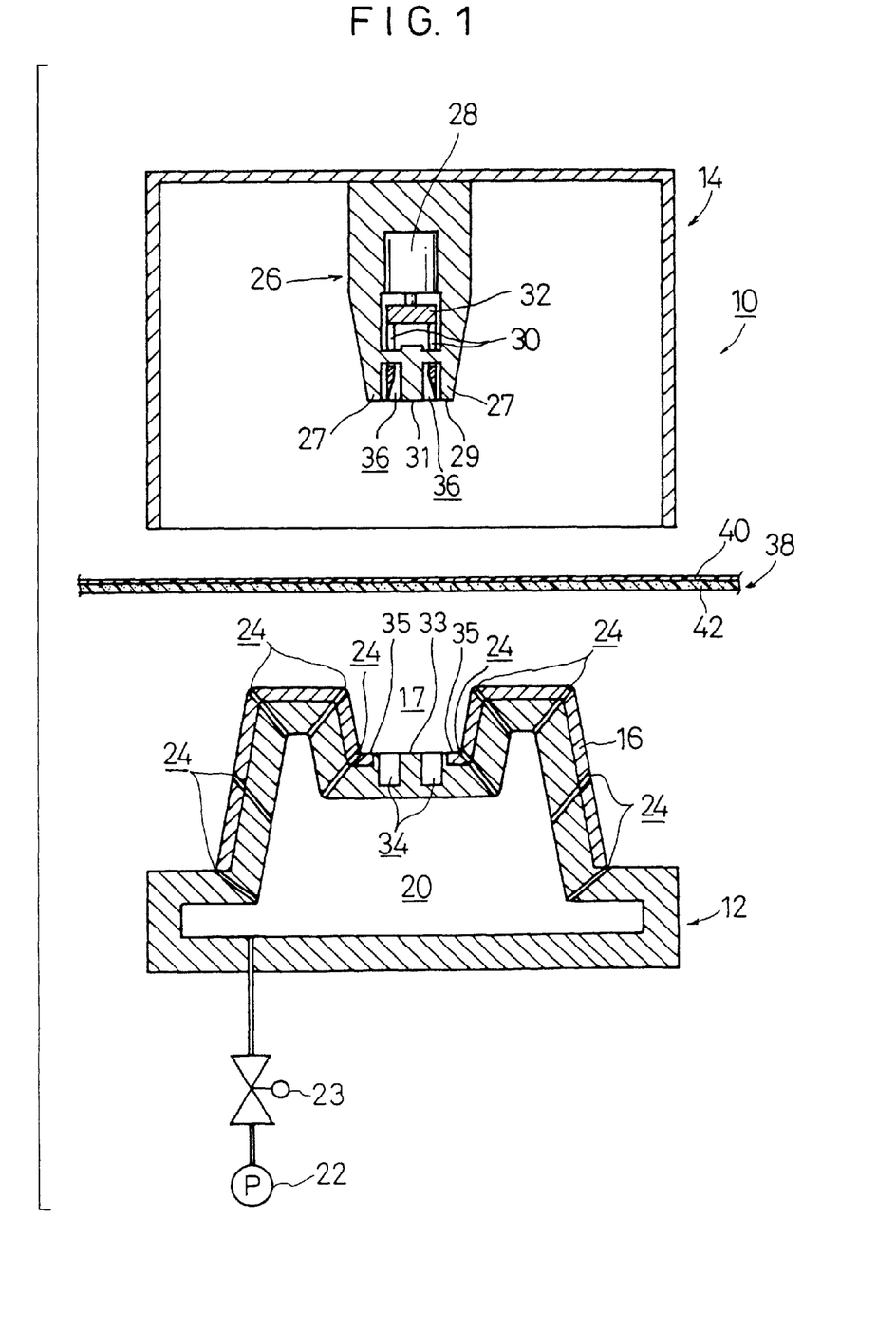
FIG. 1 is a vertical cross-sectional view of a vacuum forming apparatus according to an embodiment of the present invention.

As shown in FIG. 1, a vacuum forming apparatus 10 according to an embodiment of the present invention basically comprises a first mold 12 and a second mold 14 above the first mold 12. The first mold 12 has a forming surface 16 projecting upwardly and including an upwardly open recess 17 defined substantially centrally in the forming surface 16. The first mold 12 has a hollow space 20 defined therein which is connected through a valve 23 to a vacuum pump 22. The hollow space 20 communicates with the forming surface 16 through holes 24 defined in a wall which has the forming surface 16 on its outer surface.

Figure 2:
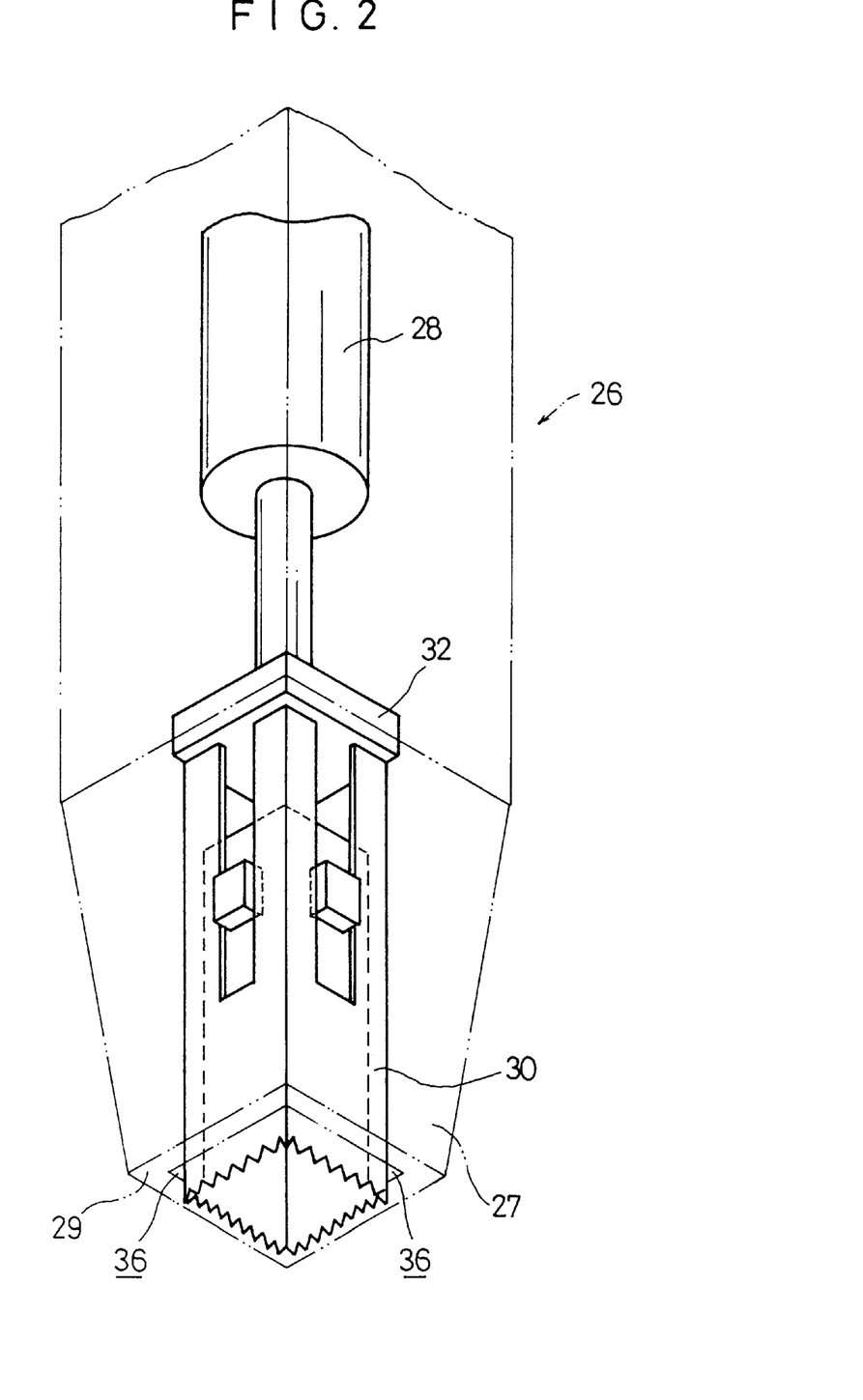
FIG. 2 is an enlarged perspective view of a presser of the vacuum forming apparatus shown in FIG. 1.

The second mold 14 includes a downwardly projecting presser 26 (see also FIG. 2). The presser 26 has a plug 27 complementary in shape to the recess 17 in the forming surface 16. The plug 27 has an outer surface which serves as a forming surface. As shown in FIGS. 1 and 2, plug 27 of the presser 26 also includes a peripheral underside pressing surface 29 which surrounds the trimming blade 30 on all sides thereof. As seen in FIG. 1, in addition to the peripheral underside pressing surface 29, a central underside pressing surface 31 is also disposed centrally in the plug, the central pressing surface 31 being surrounded by the trimming blade 30. The presser 26 also has an actuator comprising a cylinder 28 disposed in an upper portion thereof for vertically displacing a cutter 32 in the second mold 14. The cutter 32 comprises a serrated trimming blade 30. The first mold 12 has a lower groove 34 defined in the bottom of the recess 17 for receiving the cutter 32 therein. Defined centrally in the bottom of the recess 17, and surrounded by the groove 34, is another pressing surface 33 arranged oppositely to the central underside pressing surface 31 of the plug 27. Surrounding the groove 34 is another peripheral pressing surface 35 arranged opposite to the peripheral underside pressing surface 29. The plug 27 of the second mold 14 has an upper groove 36 defined therein which accommodates the cutter 32.

Operation of the vacuum forming apparatus 10 will be described below.

Figure 3:
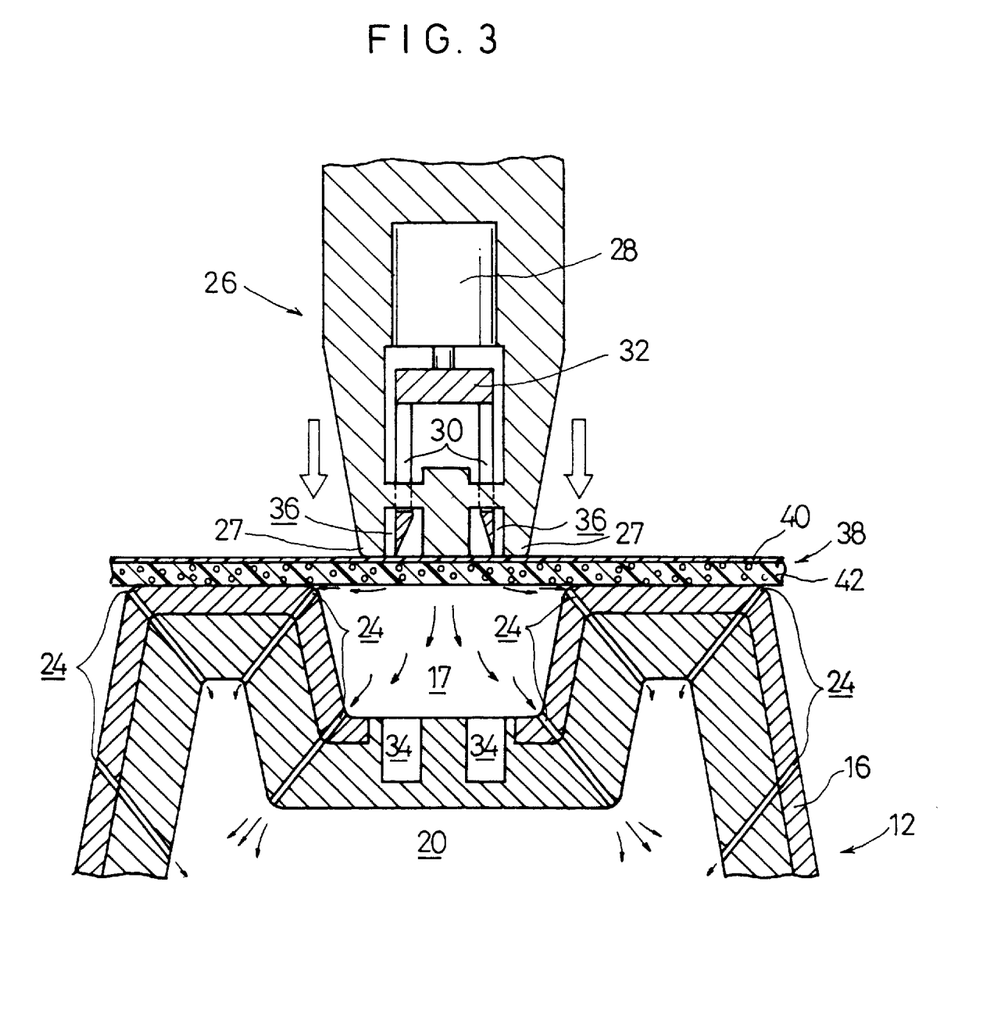
FIG. 3 is a fragmentary cross-sectional view showing the manner in which a sheet is pressed by the presser in the vacuum forming apparatus shown in FIG. 1.

The first mold 12 and the second mold 14 are spaced vertically away from each other, and a sheet 38 (see FIG. 3) is placed on the forming surface 16 of the first mold 12 and secured in position by sheet clamps (not shown). The sheet 38 is of a laminated structure having a surface layer 40 and a foamed layer 42 disposed underneath the surface layer 40. The sheet 38 has been plastified with heat by a heating device (not shown).

Figure 4:
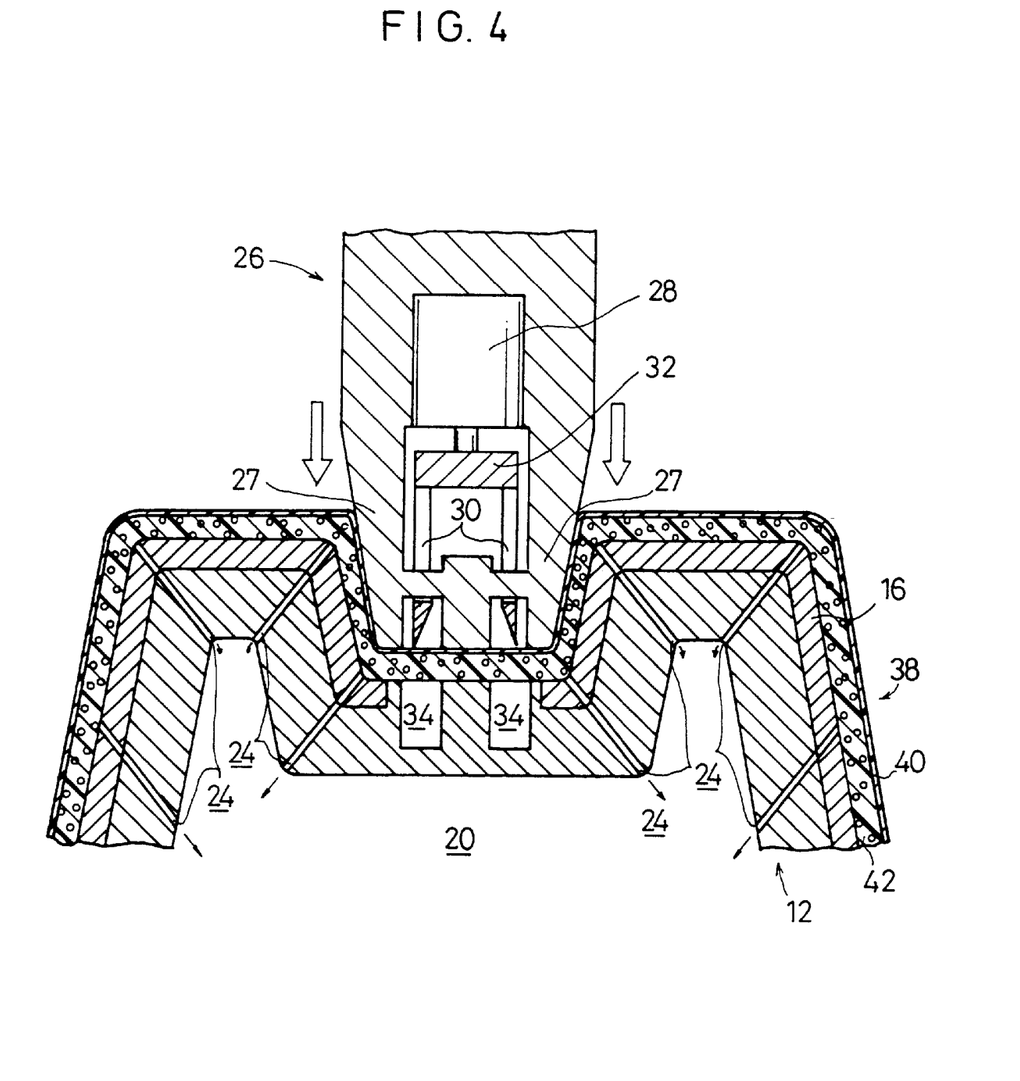
FIG. 4 is a fragmentary cross-sectional view showing the manner in which the sheet is drawn by a vacuum in the vacuum forming apparatus shown in FIG. 1.
Figure 5:
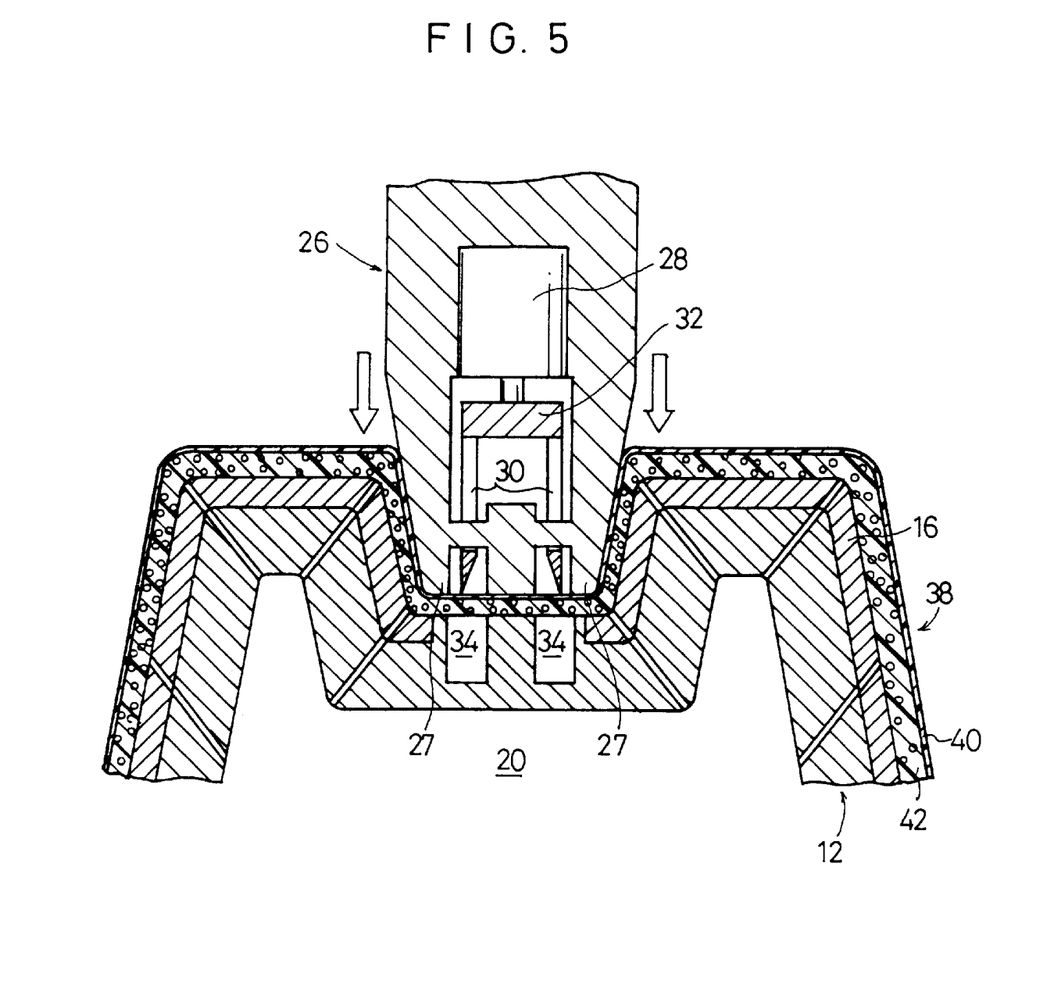
FIG. 5 is a fragmentary cross-sectional view showing the manner in which the sheet is sandwiched between first and second molds in the vacuum forming apparatus shown in FIG. 1.

Then, hot air is applied downwardly to the sheet 38 by an air blower (not shown), and the vacuum pump 22 is actuated to evacuate the recess 20 for thereby drawing the sheet 38 into intimate contact with the forming surface 16 (see FIG. 4). At the same time, the sheet 38 is pressed between the first and second molds 12, 14 as shown in FIG. 5. Specifically, the plug 27 is advanced into the recess 17 to sandwich the sheet 38 between the first and second molds 12, 14.

At this time, the sheet 38 is pressed into the bottom of the recess 17 by the peripheral underside pressing surface 29 and central underside pressing surface 31 of the plug 27. More specifically, at a peripheral area surrounding the trimming blade 30, the sheet 38 is between the peripheral underside pressing surface 29 and a bottom surface 31 of the recess 17. Further, the sheet 38 is also pressed between respective central pressing surfaces 31 and 33 which are disposed centrally inward of the trimming blade 30. Therefore, the sheet is pressed, both inwardly and outwardly of the trimming blade 30, and substantially spherical closed cells containing air in the foamed layer are prevented from being broken, and from floating or being deformed while the sheet is being cut off by the trimming cutter. Therefore, the trimming cutter applies reliable shearing forces to the sheet so as to reliably cut off the sheet.

The vacuum pump 22 and the air blower are inactivated, and the sheet 38 is cooled to a hardened state. After the sheet is hardened, the cylinder 28 is operated to displace the cutter 32 downwardly. The serrated trimming blade 30 of the cutter 32 projects downwardly from the upper groove 36 through the sheet 38 into the lower groove 34, cutting off the sheet 38 (see FIG. 6). The sheet 38 is cut off by the serrated trimming blade 30 while the sheet 38 is held at a normal temperature. Therefore, the sheet 38 is prevented from being burred, i.e., free from burrs which would otherwise been produced especially when the sheet is trimmed when hot.

Figure 6:
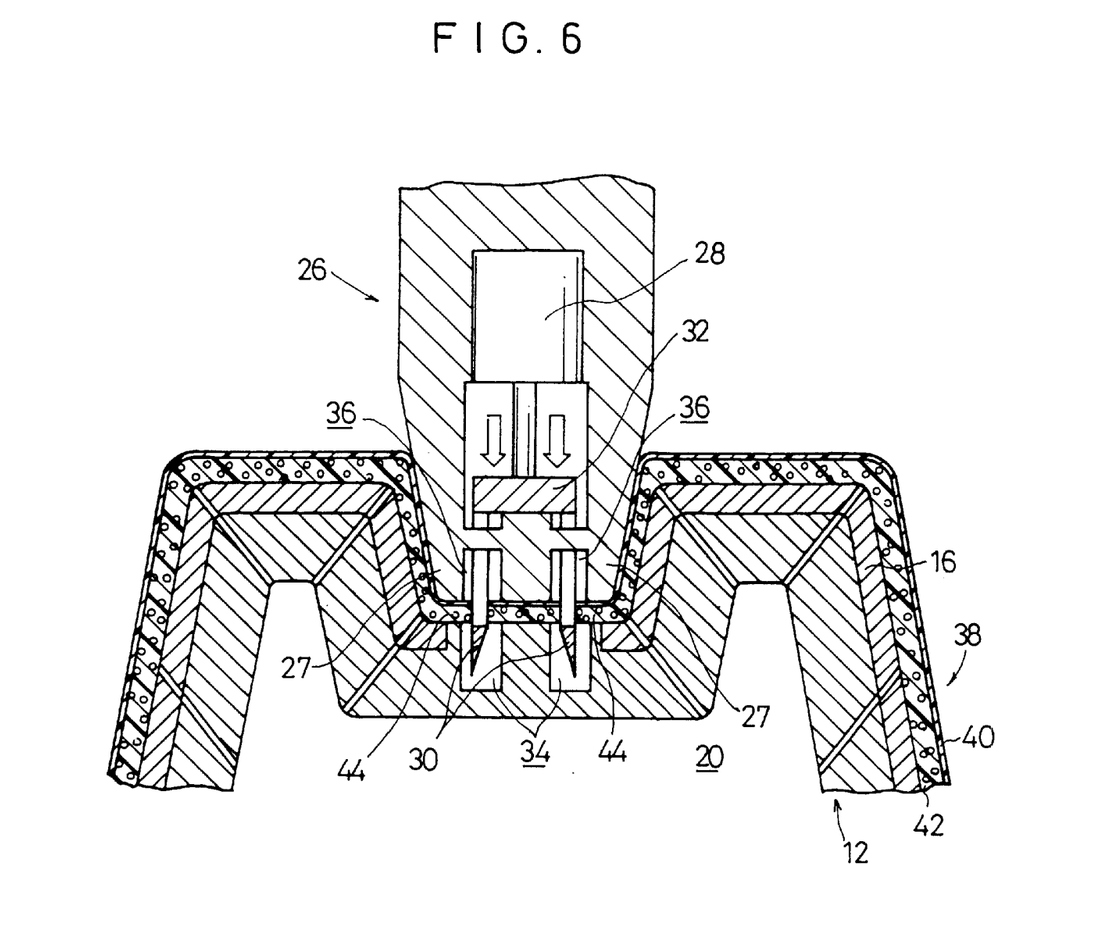
FIG. 6 is a fragmentary cross-sectional view showing the manner in which the sheet is cut off by a cutter in the vacuum forming apparatus shown in FIG. 1.

At this time, the tip end of the plug 27 presses a region 44 of the sheet 38 near the cut area thereof for preventing the serrated trimming blade 30 from being resiliently deformed near the cut area of the sheet 38. The serrated trimming blade 30 can thus easily cut into the sheet 38 for easily severing the sheet 38. The serrated edge of the serrated trimming blade 30 allows itself to cut off the sheet 38 smoothly with utmost ease. Specifically, when the sheet 38 is cut off by the serrated trimming blade 30, substantially spherical closed cells containing air in the foamed layer 42 are moved by teeth of the serrated trimming blade 30 into recesses between the teeth of the serrated trimming blade 30. Therefore, the cells are not floating around, but stabilized, in the foamed layer 42, so that the sheet 38 can easily and smoothly be cut off by the serrated trimming blade 30.

Figure 7:
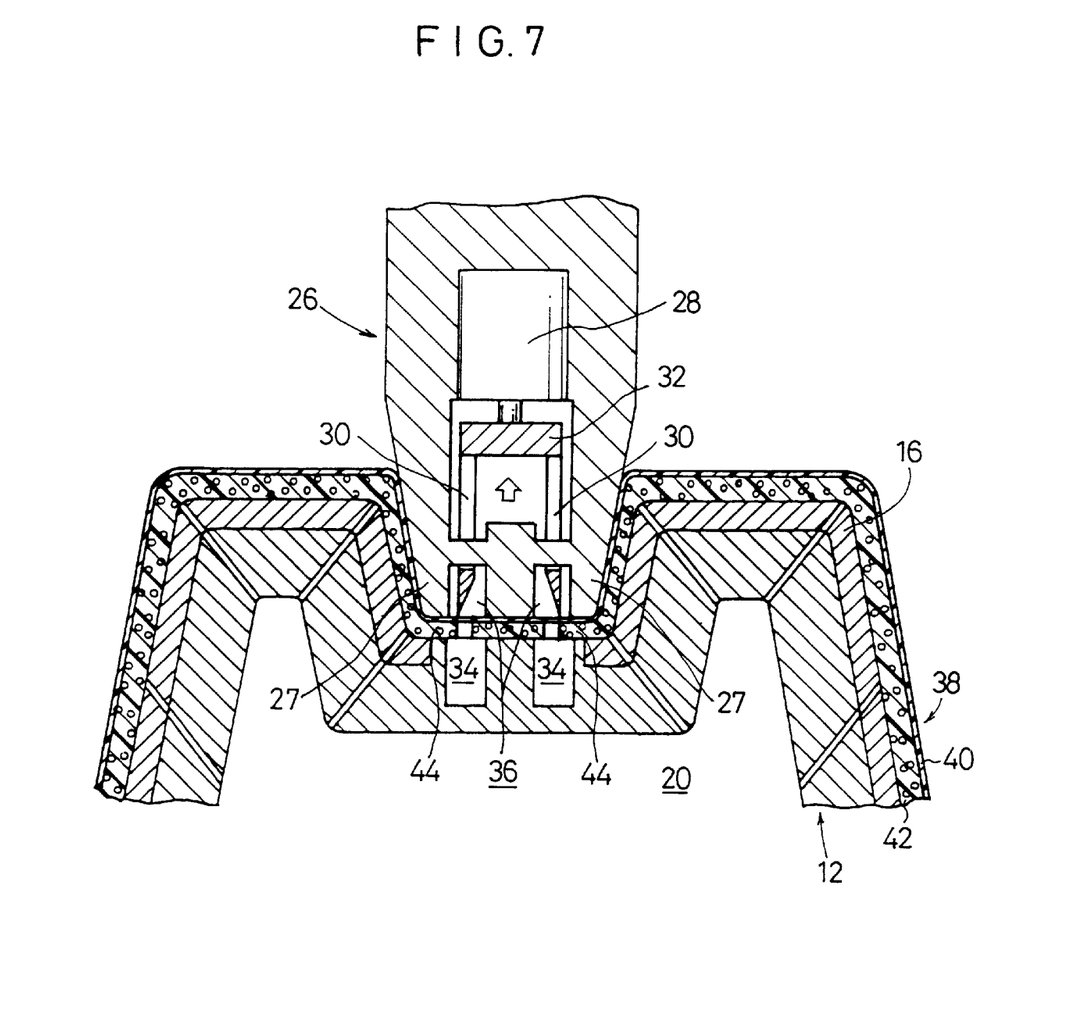
FIG. 7 is a fragmentary cross-sectional view showing the manner in which the cutter is displaced upwardly in the vacuum forming apparatus shown in FIG. 1.
Figure 8:
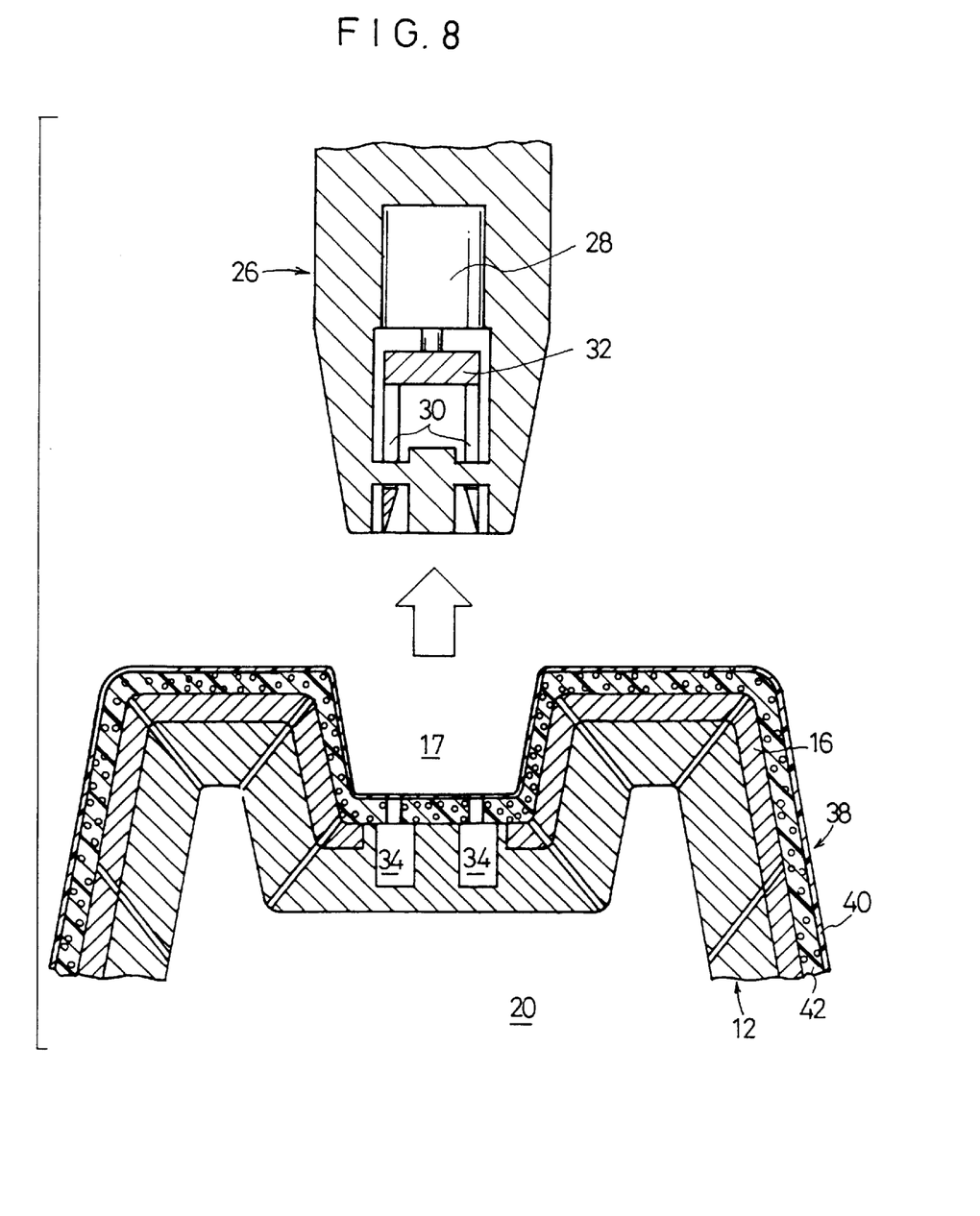
FIG. 8 is a fragmentary cross-sectional view showing the manner in which the first and second molds are spaced from each other in the vacuum forming apparatus shown in FIG. 1.
Figure 9:
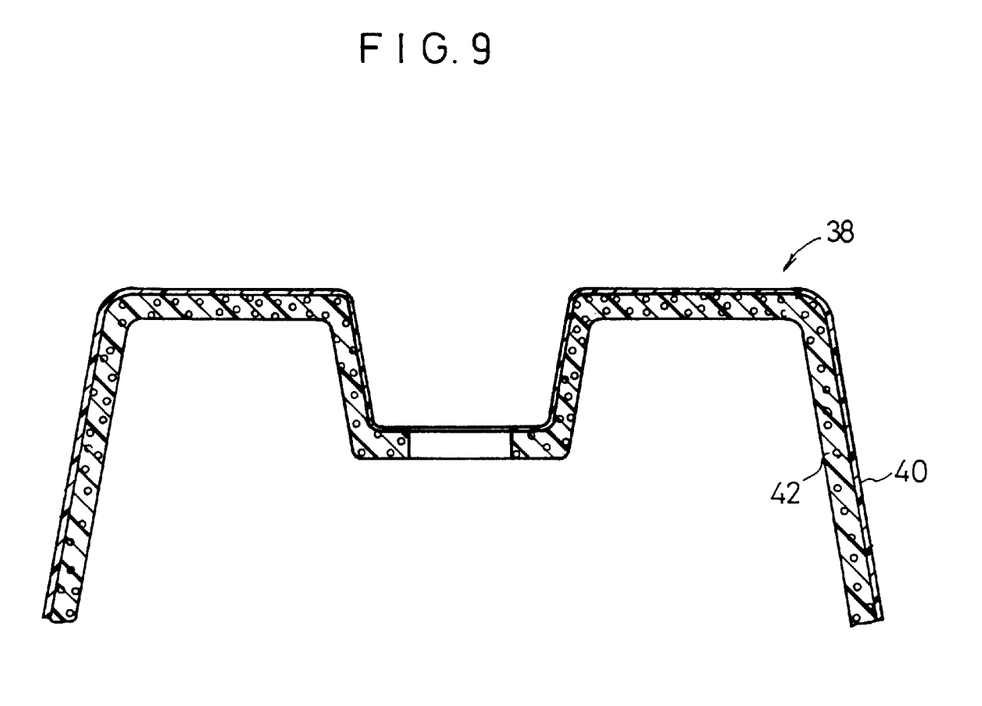
FIG. 9 is a cross-sectional view of the sheet formed by the vacuum forming apparatus shown in FIG. 1.

After the sheet 38 is cut off, the cutter 32 is moved upwardly into the upper groove 36 by the cylinder 38 (see FIG. 7). The cutting process is now completed. The second mold 14 is then spaced upwardly away from the first mold 12, as shown in FIG. 8. The sheet 38 formed and cut to a desired shape is now produced, as shown in FIG. 9.

An experiment was conducted on the vacuum forming apparatus 10 for cutting off a sheet including a foamed layer. Results of the experiment will be described below.

The surface layer 40 comprised a PVC (polyvinyl chloride) layer having a thickness of 0.6 mm, and the foamed layer 42 comprised a formed layer of PP (polypropylene) having a thickness of 2.0 mm and expanded 20 times in size. The sheet 38 had a total thickness of 2.6 mm. The sheet 38 was heated to a temperature of 160° C.±5° C. at the surface layer 40 and a temperature of 147° C.±5° C. at the foamed layer 42, and placed between the first and second molds 12, 14, and then pressed against the first mold 12 by the second mold 14. The region 44 of the sheet 38 near the cut area thereof had a thickness of 1.0 mm. Then, the sheet 38 was cooled to a hardened state. When the sheet 38 was cut, its temperature was 71° C. The load applied to the cutter 30 at different tooth angles ranged from 0.65 kg/cm$^2$ (90°) to 1.14 kg/cm$^2$ (45°), and the cutter 30 was moved downwardly at a constant speed of 500 mm/second. The sheet 38 thus formed and trimmed was free of carbonized layers and burrs which would otherwise been produced especially when trimmed when hot.

Figure 10:
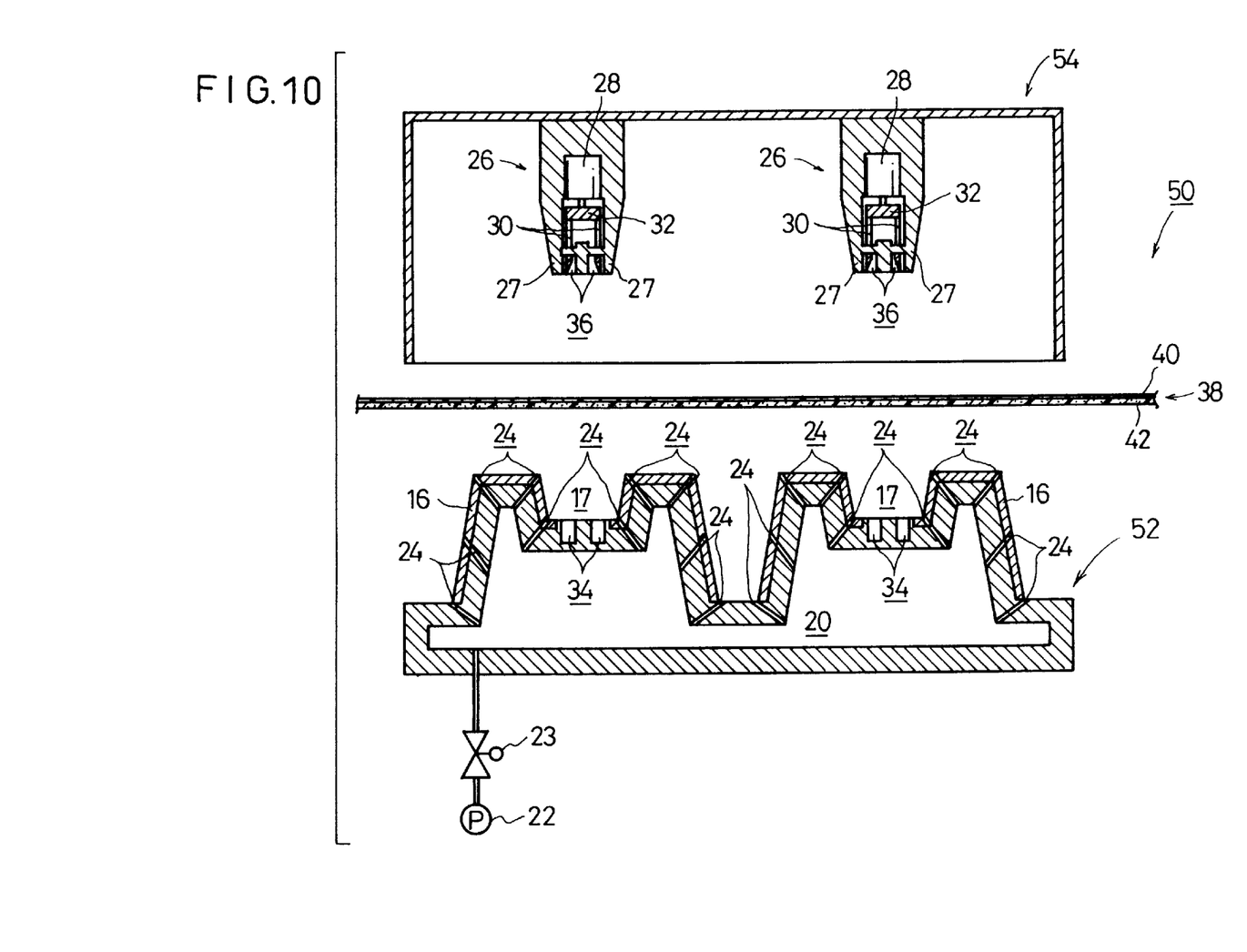
FIG. 10 is a vertical cross-sectional view of a vacuum forming apparatus according to another embodiment of the present invention.

FIG. 10 shows a vacuum forming apparatus 50 according to another embodiment of the present invention. Those parts shown in FIG. 10 which are identical to those of the vacuum forming apparatus 10 are denoted by identical reference numerals and will not be described in detail below.

The vacuum forming apparatus 50 comprises a first mold 52 and a second mold 54. The first mold 52 has two forming surfaces 16, and the second mold 54 has two cutters 32 for trimming a sheet 38 at two locations thereon. The first mold 52 may have three or more forming surfaces 16, and the second mold 54 may have three or more cutters 32 for trimming a sheet 38 at three or more locations thereon.

The vacuum forming apparatus 10, 50 according to the present invention, and the vacuum forming process carried out thereby offer the following advantages.

If a sheet to be formed is a laminated sheet including a resilient foamed layer, the formed layer is prevented from being dragged in a trimming direction by the trimming cutter as it moves to trim the sheet. The trimming cutter can easily cut off the sheet without being heated.

Substantially spherical closed cells containing air in the foamed layer are prevented from being broken, and from floating or being deformed while the sheet is being cut off by the trimming cutter. Therefore, the trimming cutter applies reliable shearing forces to the sheet and hence can reliably cut off the sheet.

Cut edges of the sheet are neat because they are not burred, and allow a component to be easily mounted in an opening defined by the cut edges in the sheet.

Although certain preferred embodiments of the present invention has been shown and described in detail, it should be understood that various changes and modifications may be made therein without departing from the scope of the appended claims.

What is claimed is:

1. An apparatus for forming a sheet according to a vacuum forming process comprising:

a first mold having a forming surface, said forming surface comprising an open recess over which the sheet is initially positioned, said first mold having a plurality of holes communicating with said forming surface for attracting the sheet against said forming surface under a vacuum applied through the holes; and a second mold having a presser for pressing said sheet into said recess to thereby form a predetermined shape against said forming surface;

wherein said second mold comprises said presser for pressing a region of said sheet at a position within said recess of said first mold, and a cutter displaceable with respect to said presser after said presser presses said region, said cutter including a serrated trimming blade for cutting off said sheet near said region, and wherein said presser comprises a plug complementary in shape to said recess and having a peripheral underside pressing surface disposed surrounding said serrated trimming blade; and means for displacing said plug together with said cutter including said trimming blade into said recess such that said sheet is pressed against a bottom of said recess by said peripheral underside pressing surface, and an actuator for displacing said cutter including the trimming blade relative to said plug to trim said sheet, wherein said plug further comprises a central underside pressing surface for pressing a center region of said sheet against a bottom central surface of said recess, wherein said first mold further comprises a groove therein surrounding said bottom central surface for receiving a tip end of said serrated trimming blade after said trimming blade has trimmed said sheet.

2. The apparatus according to claim 1 wherein said second mold has a groove which accommodates said serrated trimming blade therein.

3. The apparatus according to claim 1, wherein the sheet is a laminated sheet.

4. The apparatus according to claim 3, wherein the laminated sheet includes a foamed layer and a surface layer.

5. The apparatus according to claim 4, wherein the laminated sheet has a total thickness of 2.6 mm.

6. The apparatus according to claim 4, wherein the surface layer comprises a PVC (polyvinyl chloride) layer having a thickness of 0.6 mm.

7. The apparatus according to claim 4, wherein the foamed layer comprises a polypropylene layer having a thickness of 2.0 mm.

8. The apparatus according to claim 1, wherein the actuator comprises a cylinder.

* * * * *

UNITED STATES PATENT AND TRADEMARK OFFICE
CERTIFICATE OF CORRECTION

PATENT NO. : 6,056,531
DATED : May 2, 2000
INVENTOR(S) : Furuya et al.

It is certified that error appears in the above-identified patent and that said Letters Patent is hereby corrected as shown below:

On the title page, in item "[73] Assignee:" please change the assignee from "Honda Giken Kabushiki Kaisha, Tokyo, Japan" to -- Honda Giken Kogyo Kabushiki Kaisha, Tokyo, Japan --.

Signed and Sealed this

Tenth Day of April, 2001

*Attest:*

NICHOLAS P. GODICI

*Attesting Officer*     *Acting Director of the United States Patent and Trademark Office*